United States Patent
Yamashita

[11] Patent Number: 5,289,757
[45] Date of Patent: Mar. 1, 1994

[54] REACTION ASSEMBLY FOR LIQUID PRESSURE BOOSTER

[75] Inventor: Kuraji Yamashita, Saitama, Japan
[73] Assignee: Jidosha Kiki Co., Ltd., Tokyo, Japan
[21] Appl. No.: 12,903
[22] Filed: Feb. 3, 1993
[30] Foreign Application Priority Data Apr. 21, 1992 [JP] Japan ................. 4-33402[U]

[51] Int. Cl.⁵ ............................................. F15B 9/10
[52] U.S. Cl. ........................................ 91/373; 91/377
[58] Field of Search ............... 91/368, 370, 371, 372, 91/373, 376 R, 377, 388

[56] References Cited

U.S. PATENT DOCUMENTS

| | | |
|---|---|---|
| 3,845,693 | 11/1974 | Meyers . |
| 4,075,848 | 2/1978 | Ueda . |
| 4,203,631 | 5/1980 | Rivetti et al. . |
| 4,611,526 | 9/1986 | Arino et al. . |
| 4,624,107 | 11/1986 | Horiuchi et al. . |
| 4,656,923 | 4/1987 | Tsuyuki et al. . |
| 4,706,546 | 11/1987 | Inoue et al. ............... 91/370 |
| 4,773,223 | 9/1988 | Mizusawa et al. . |
| 4,862,787 | 9/1989 | Suzuki et al. . |
| 4,967,560 | 11/1990 | Konishi ............. 91/376 R X |
| 5,010,732 | 4/1991 | Yagi . |
| 5,076,141 | 12/1991 | Konishi ............. 91/376 R X |
| 5,146,837 | 9/1992 | Inoue . |
| 5,168,790 | 12/1992 | Konishi ............. 91/376 R X |
| 5,176,064 | 1/1993 | Kobayashi ............ 91/376 R |

FOREIGN PATENT DOCUMENTS

| | | |
|---|---|---|
| 55-44095 | 3/1980 | Japan . |
| 56-90765 | 7/1981 | Japan . |
| 1-60871 | 3/1990 | Japan . |
| 2-74456 | 3/1990 | Japan . |
| 4-03287444 | 12/1991 | Japan ............. 91/376 R |

*Primary Examiner*—Edward K. Look
*Assistant Examiner*—John Ryznic
*Attorney, Agent, or Firm*—Flynn, Thiel, Boutell & Tanis

[57] ABSTRACT

A housing is provided with a guide which projects into a cylindrical section of a power piston. A reaction piston is slidably supported by the guide, and an input shaft is in turn slidably supported by the reaction piston. A spring which urges the reaction piston is disposed in a clearance defined between the outer periphery of the guide and the inner periphery of the cylindrical section of the power piston. A first engaging portion is formed on the reaction piston to project radially outward, and a first stop is formed on the cylindrical section to restrict a rearward movement of the reaction piston. A second engaging portion is formed on the input shaft so as to project radially outward while a second stop is formed on the reaction piston to restrict a rearward movement thereof. With this arrangement, an increase in the axial and the diametrical dimension of a liquid pressure booster can be prevented.

7 Claims, 4 Drawing Sheets

REACTION ASSEMBLY FOR LIQUID PRESSURE BOOSTER

FIELD OF THE INVENTION

The invention relates to a liquid pressure booster as may be used in a brake booster, for example, and more particularly, to a reaction assembly for a liquid pressure booster which is provided with a reaction piston.

DESCRIPTION OF THE PRIOR ART

A reaction assembly for a liquid pressure booster is known in the art, as comprising a power piston slidably disposed in a housing and having a cylindrical rear section, a power chamber defined in the rear portion of the power piston within the housing, an input shaft slidably extending into the housing from the rear side of the power piston, a control valve disposed inside the cylindrical section and extending across the power piston and the inner end of the input shaft for supplying a liquid pressure which depends upon an input applied to the input shaft to the power chamber, a reaction piston slidably disposed around the input shaft and responsive to a liquid pressure within the power chamber to be retracted relative to the input shaft for abutment against a stop on the input shaft, and a spring disposed between the power piston and the reaction piston for maintaining the reaction piston at an advanced position spaced from the stop with a given resilience (see Japanese Laid-Open Patent Applications No. 60,871/1990 and No. 74,456/1990).

In the liquid pressure booster mentioned above, as the input shaft is driven forward, the control valve is effective to supply a liquid pressure to the power chamber which depends on an input applied to the input shaft, thereby causing an advancing movement of the power piston to provide a booster action. The liquid pressure supplied to the power chamber acts upon the input shaft to provide a reaction thereto, and also acts upon the reaction piston to retract it relative to the input shaft against the resilience of the spring.

Prior to the abutment of the reaction piston against the stop on the input shaft, the liquid pressure only acts upon the input shaft which has a relatively reduced pressure responsive area, whereby an output increases with an increased booster ratio. However, when the reaction piston abuts against the stop on the input shaft and thus becomes integral therewith, the pressure responsive area increases, and accordingly an output increases with a reduced booster ratio. The increased booster ratio which obtains during the initial phase of operation assures a favorable operation feeling.

Various other forms of liquid pressure boosters provided with a reaction piston are also known, even though the general arrangement is different (see Japanese Laid-Open Patent Applications No. 44,095/1980 and No. 90,765/1981).

A conventional reaction assembly for liquid pressure booster which is constructed in the manner mentioned above suffers from an increased axial dimension since the input shaft is required to include a portion which slides relative to the housing, in tandem to a sliding portion of the reaction piston.

SUMMARY OF THE INVENTION

In view of the foregoing, the invention allows the axial dimension of a liquid pressure booster to be prevented, to the maximum possible extent, from increasing, by assembling a reaction piston into the booster in a sophisticated manner.

Specifically, in a reaction assembly for a conventional liquid pressure booster constructed in a manner mentioned above, in accordance with the invention, the housing is provided with a guide which projects into the cylindrical section of the power piston, with the reaction piston being slidably fitted in the guide, which in turn slidably supports the reaction piston, into the shank portion of which the input shaft is slidably fitted so as to allow the input shaft to be slidably supported by the reaction piston.

At a position forward of the guide, the reaction piston is formed with a first engaging portion which projects radially outward within the cylindrical section of the power piston and which is reciprocable with respect to the power piston. The cylindrical section of the power piston is formed with a first stop which restricts a rearward movement of the first engaging portion beyond a given stroke, and the spring mentioned above is disposed in a clearance formed between the outer periphery of the guide and the inner periphery of the cylindrical section of the power piston so as to resiliently act between the first engaging portion and the power piston. Finally, the input shaft is formed with a second engaging portion which projects radially outward within the reaction piston and which is reciprocable with respect to the reaction piston, while the reaction piston is formed with a second stop which restricts a rearward movement of the second engaging portion beyond a given stroke.

With the described arrangement, the guide on the housing projects into the cylindrical section of the power piston, and slidably supports the reaction piston, which in turn slidably supports the input shaft, and the spring which urges the reaction piston is disposed in a clearance formed between the outer periphery of the guide and the inner periphery of the cylindrical section of the power piston. In this manner, the guide, the sliding portion of the reaction piston, the sliding portion of the input shaft and the spring can be disposed radially of each other while allowing their axial overlap, thereby preventing the axial dimension of the liquid pressure booster from increasing, to the possible maximum extent.

On the other hand, when the guide on the housing projects into the cylindrical section of the power piston, the diametrical dimension of the booster may increase. Specifically, when the guide projects into the cylindrical section of the power piston, it becomes necessary to provide stop means located between the forward end portion of the input shaft which projects beyond the guide and the cylindrical section of the power piston for restricting the rearward movement of the input shaft relative to the power piston. However, the input shaft is surrounded by the reaction piston, but the spring must be disposed between the reaction piston and the power piston in order to maintain the reaction piston at a foremost or advanced position relative to the power piston when inoperative.

If the stop means is to be provided under such condition, the input shaft may be provided with an engaging portion which radially extends through the reaction piston and which is reciprocable with respect to the reaction piston while one end of a stop member may be secured to the power piston while the other end of the stop member may extend inside the spring which is disposed between the reaction piston and the power piston so that the engaging portion on the input shaft may be held in abutment against the stop member to restrict its rearward movement. However, such an arrangement results in an increased diametrical dimension of the booster inasmuch as the stop member must be disposed between the guide and the spring.

However, with the arrangement of the invention, the first engaging portion formed on the reaction piston may abut against the first stop on the cylindrical section of the power piston to limit its rearward movement while the second engaging portion formed on the input shaft may be held in abutment against the second stop on the reaction piston to restrict its rearward movement, whereby the reaction piston, the rearward movement of which is restricted by the power piston, may be utilized as stop means for the input shaft. As a consequence, it is unnecessary to provide stop means inside the spring disposed between the first engaging portion on the reaction piston and the power piston, thereby allowing the diametrical dimension of the booster to be reduced by a corresponding amount.

Above and other objects, features and advantages of the invention will become apparent from the following detailed description of an embodiment thereof with reference to the attached drawings.

DETAILED DESCRIPTION OF EMBODIMENT

Figure 1:
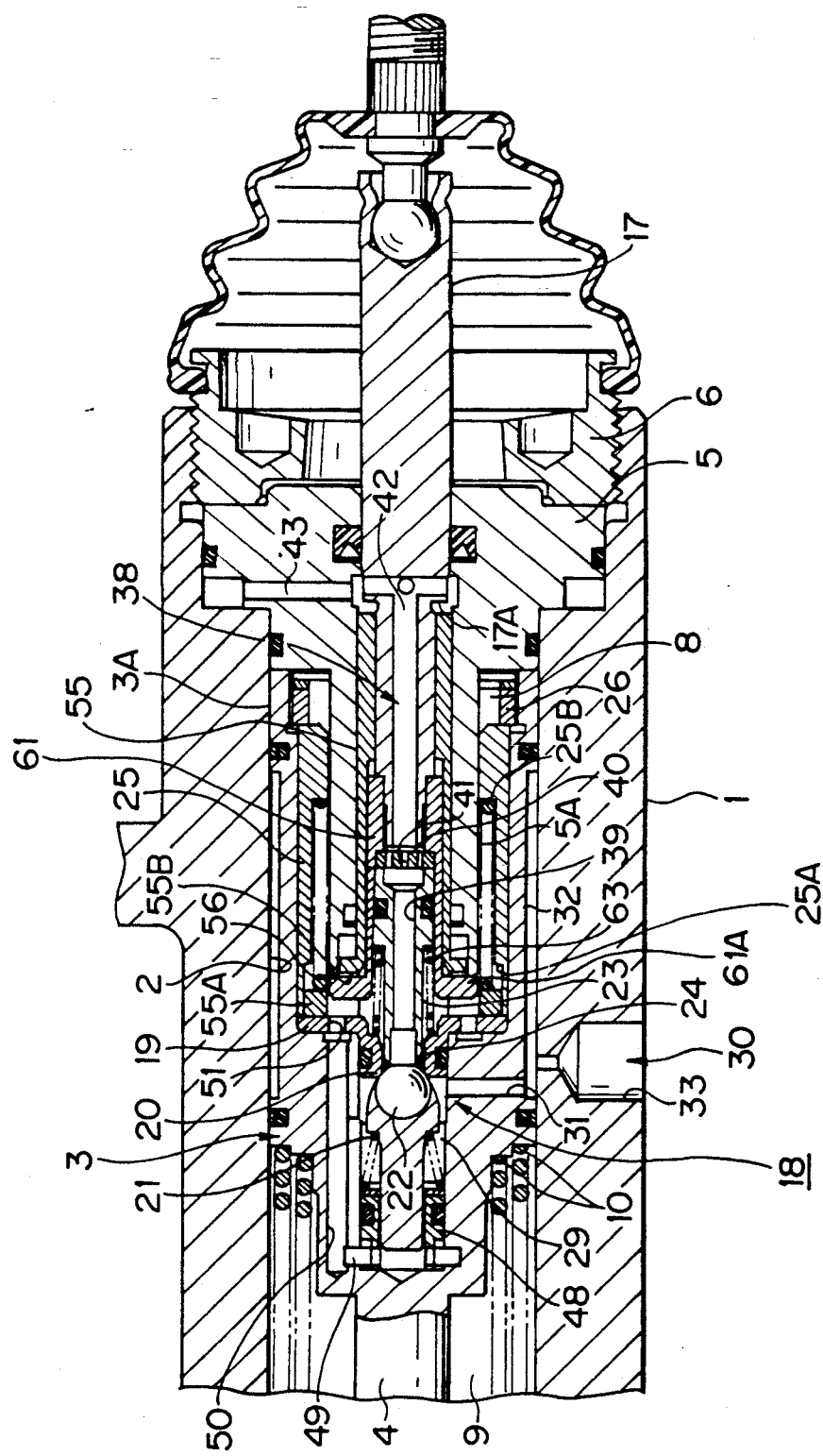
FIG. 1 is a longitudinal section of one embodiment of the invention.

Referring to the drawings, the invention will now be described with reference to an embodiment shown. In FIG. 1, a liquid pressure booster includes a housing 1 having a bore 2 formed therein, in which a power piston 3 having a cylindrical section 3A at its right-hand rear portion is slidably fitted. A push rod 4 extends from the left end of the power piston 3, and slidably projects externally of the housing 1 while maintaining a liquid tightness, with its free end being connected to a piston of a master cylinder, not shown.

At its right end, the opening of the bore 2 is sealed by a plug 5, which forms part of the housing 1, and which is integrally secured thereto by a nut 6 which threadably engages the housing 1. Defined between the plug 5 and the power piston 3 is a power chamber 8, into which a pressure liquid is introduced, while a low pressure chamber 9 is defined on the opposite side of the power piston 3 from the power chamber 8, and houses a spring 10 therein which normally maintains the power piston 3 in its inoperative position shown where the latter abuts against the plug 5. The low pressure chamber 9 containing the spring 10 communicates with a reservoir through a passage, not shown.

An input shaft 17 which is mechanically coupled to a brake pedal, not shown, slidably extends through the plug 5, which forms part of the housing 1, and a control valve 18 is formed across the left or free end of the input shaft 17 and the inside of the cylindrical section 3A of the power piston 3.

The control valve 18 comprises a first valve seat 20 formed on a plate 19 which is disposed inside the cylindrical section 3A of the power piston 3, a ball valve 22 which is seated upon the first valve seat 20, from the side opposite from the power chamber 8, under the resilience of a spring 21, an annular pin 23 formed on the free end of the input shaft 17 for moving the ball valve 22 away from the first valve seat 20, and a second valve seat 24 formed on the free end of the annular pin 23 and upon which the ball valve 22 may be seated. The plate 19 is secured to the power piston 3 by a retainer 25 and a set screw 26 which is threadably engaged with the cylindrical section 3A of the power piston 3.

In the inoperative position shown, the ball valve 22 is seated upon the first valve seat 20 under the resilience of the spring 21, interrupting a communication between the power chamber 8 located to the right of the first valve seat 20 and a pressure chamber 29 which is formed to the left thereof. The pressure chamber 29 communicates with a pump, not shown, through a supply passage 30, and the pump maintains a supply of a pressure liquid of a given pressure into the pressure chamber 29. The supply passage 30 comprises a radial path 31 formed in the power piston 3, an annular groove 32 formed in the outer peripheral surface of the power piston 3, a radial path 33 formed in the housing 1, and a conduit, not shown, which connects between the path 33 and the pump.

Also in the inoperative position shown, the second valve seat 24 formed on the free end of the annular pin 23 is located away from the ball valve 22 which is then seated upon the first valve seat 20, whereby the power chamber 8 communicates with the reservoir through a discharge passage 38. The discharge passage 38 comprises a path 39 formed in the shank portion of the annular pin 23, a plurality of paths 41 formed in a shim 40 interposed between the annular pin 23 and the input shaft 17, a path 42 formed in the shank portion of the input shaft 17, and a path 43 formed in the plug 5, the path 43 communicating with the reservoir through a path, not shown, formed in the housing 1 and a conduit connected thereto.

The left end portion of the ball valve 22 which forms the control valve 18 slidably extends through a collar 48 while maintaining a liquid tightness therebetween, thereby forming a balance chamber 49 to the left side of the collar 48. The balance chamber 49 communicates with the power chamber 8 through a communication path 50 formed in the power piston 3 and a through-opening 51 formed in the plate 49, the arrangement being such that the pressure responsive area of the ball valve 22 subject to the pressure of the balance chamber 49 is chosen to be greater than the area defined by the internal diameter of the first valve seat 20 from which the area defined by the internal diameter of the second valve seat 24 is subtracted, or the pressure responsive area of the ball valve 22 subject to the pressure of the power chamber 8.

When the pressure responsive areas are chosen in this manner, as the input shaft 17 and the annular pin 23 are driven forward to move the ball valve 22 away from the first valve seat 20 to cause an increase in the pressure prevailing in the power chamber 8, a liquid leakage which might result from a movement of the ball valve 22 seating upon the second valve seat 24 on the annular pin 23 away from the second valve seat 24 is prevented.

The plug 5, which forms part of the housing 1, is formed with a cylindrical guide 5A at its left end, which projects into the cylindrical section 3A of the power piston 3. A reaction piston 55 is slidably fitted in the guide 5A, which in turn slidably supports the reaction piston 55. The input shaft 17 is slidably fitted in the axial portion of the reaction piston 55, which in turn slidably supports the input shaft 17 while it is supported by the guide 5A.

Figure 2:
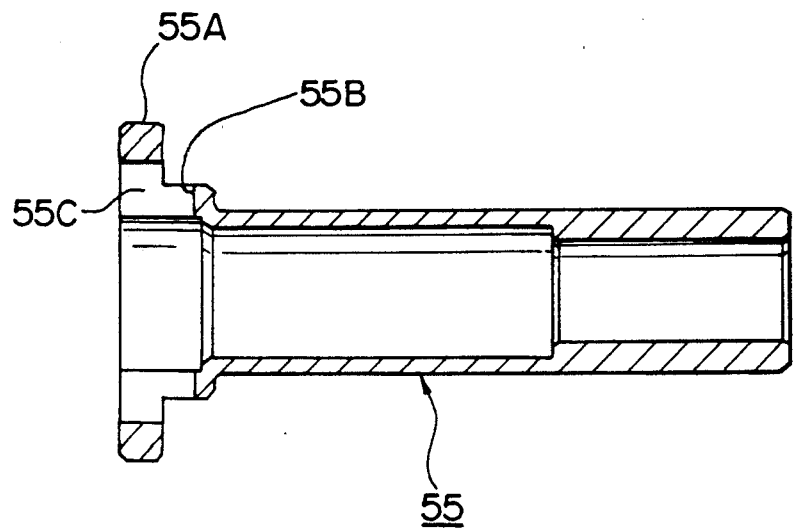
FIG. 2 is a section, to an enlarged scale, of a reaction piston 55 shown in FIG. 1.
Figure 3:
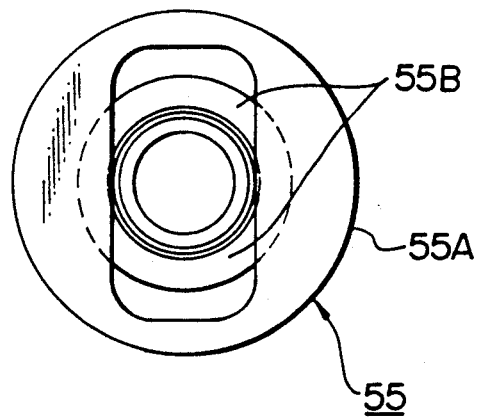
FIG. 3 is a left-hand side elevation of FIG. 2.

As shown in FIGS. 1 to 3, at a position forward of the guide 5A, the left end of the reaction piston 55 is formed with a first engaging portion 55A in the form of a flange which projects radially outward within the cylindrical section 3A of the power piston 3 and which is reciprocable with respect to the power piston 3. On the other hand, a first stop 25A in the form of a step is formed around the inner peripheral surface of the retainer 25 which is disposed inside the cylindrical section 3A of the power piston 3 integrally therewith, at its front end, so as to allow the abutment of the first engaging portion 55A thereagainst, thereby allowing the rearward movement of the reaction piston 55 to be restricted.

A spring 56 is disposed in a clearance defined between the outer periphery of the guide 5A and the inner periphery of the retainer 25 and resiliently acts between the first engaging portion 55A and a step 25B formed around the inner peripheral surface of the retainer 25 at its rear end for normally maintaining the reaction piston 55 in its inoperative position shown where it abuts against the plate 19.

In this arrangement, a spacing $\delta_1$ between the first engaging portion 55A on the reaction piston 55 and the first stop 25A as the piston abuts against the plate 19 is chosen to be greater than a spacing $\delta_2$ between the first engaging portion 55A on the reaction piston 55 as it abuts against the plate 19 and a stop 17A on the input shaft 17 when the second value seat 24 formed on the annular pin 23 engages or is located close to the ball valve 22, thus preventing the abutment of the first engaging portion 55A on the reaction piston 55 against the first stop 25A on the retainer 25 before the reaction piston 55 retracts relative to the input shaft 17 to abut against the stop 17A thereon.

Figure 4:
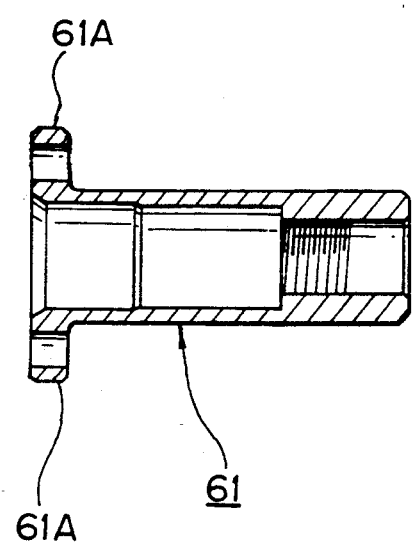
FIG. 4 is a section, to an enlarged scale, of a cylindrical stop member 61 shown in FIG. 1.
Figure 5:
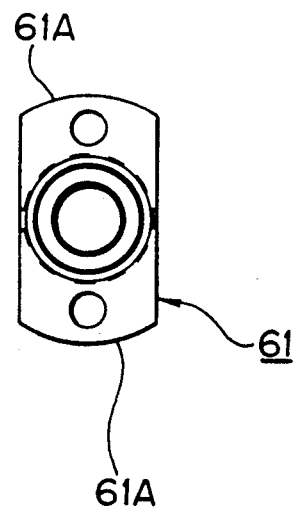
FIG. 5 is a left-hand side elevation of FIG. 4.

A cylindrical stop member 61 is secured to the free end of the input shaft 17, and the shim 40 and the annular pin 23 mentioned above are fitted therein. The left end of the cylindrical stop member 61 is formed with a pair of second engaging portions 61A which project radially outward from diametrically opposite positions, as shown in FIGS. 4 and 5. Each of the second engaging portions 61A is reciprocable within the reaction piston 55, which is provided with a second stop 55B which serves restricting a rearward movement of the second engaging portion 61A beyond a given stroke.

In order to receive the pair of second engaging portions 61A on the cylindrical stop member 61 in a reciprocable manner, the left end face of the first engaging portion 55A which is defined in the form of a flange on the left end of the reaction piston 55 is formed with a recess 55C for receiving the pair of second engaging portions 61A, as shown in FIGS. 2 and 3, with the inner wall of the recess 55C serving as the second stop 55B.

In order to reduce the stroke of a lost motion which occurs during the initial phase of operation of the input shaft 17, the periphery of the first engaging portion 55A of the reaction piston 55 is shaved off in the form of a step on its right-hand side so as to make the recess 55C in open communication with a right-hand side of the first engaging portion 55A. In addition, as shown in FIG. 1, the right end of the second engaging portion 61A which is received within each recess 55C is exposed out of the recess 55C, so that in the inoperative position shown, the right end face of the second engaging portion 61A abuts against the left end face of the guide 5A on the plug 5 under the resilience of a spring 63 which is disposed between the plate 19 and the annular pin 23.

In the described arrangement, in the inoperative position shown when a brake pedal, not shown, is not depressed, the annular pin 23 is urged to the right by the spring 63 which is disposed between the pin and the plate 19 to be removed from the ball valve 22, whereby the power chamber 8 communicates with the reservoir through the discharge passage 38.

Figure 6:
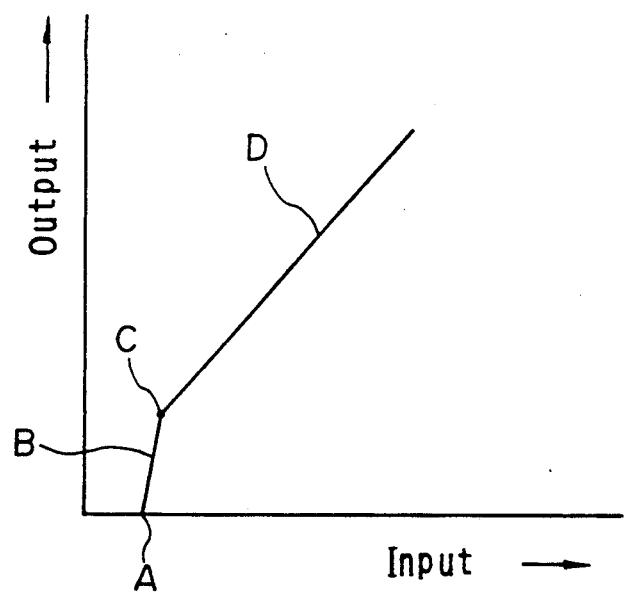
FIG. 6 graphically illustrates a response of the liquid pressure booster.

If the brake pedal is now depressed to drive the input shaft 17 forward, the second valve seat 24 formed on the free end of the annular pin 23 abuts against the ball valve 22 to interrupt the communication between the discharge passage 38 and the power chamber 8, and the annular pin 23 moves the ball valve 22 away from the first valve seat 20 against the resilience of the spring 21 (see point A in FIG. 6), whereby the pressure liquid which is normally maintained within the pressure chamber 29 is admitted into the power chamber 8 through a gap between the outer periphery of the annular pin 23 and the inner periphery of the plate 19.

When the pressure liquid is introduced into the power chamber 8 in this manner, the power piston 3 is driven to the left against the resilience of the spring 10 while the reaction piston 55 is displaced to the right against the resilience of the spring 56. However, during the initial phase of operation, the reaction piston 55 is maintained away from the stop 17A on the input shaft 17 by virtue of the spring 56.

Under this condition, the force exerted by the pressure within the power chamber 8 and acting upon the reaction piston 55 is reacted by the power piston 3 through the spring 56, the retainer 25 and the set screw 26 without being transmitted to the input shaft 17. Accordingly, a force of reaction which is transmitted through the input shaft 17 to a driver is obtained by the pressure in the power chamber 8 acting directly upon the input shaft 17. Since the pressure responsive area which the input shaft 17 then presents is relatively small, an output increases with an increased booster ratio (see line B shown in FIG. 6).

When the pressure within the power chamber 8 rises and the power piston 3 continues to be driven to the left to provide a substantial braking action, the reaction piston 55 abuts against the stop 17A on the input shaft 17 (point C in FIG. 6), whereby the force acting upon the reaction piston 55 is transmitted through the stop 17A to the input shaft 17 also, and thus the booster ratio is reduced. Accordingly, the output increases with a reduced booster ratio (see line D in FIG. 6).

If the brake is now released, the annular pin 23 is displaced to the right under the resilience of the spring 63, and the ball valve 22 is seated upon the first valve seat 20 to interrupt a communication between the pressure chamber 29 and the power chamber 8. The follows a movement of the second valve seat 24 on the annular pin 23 away from the ball valve 22, which allows the power chamber 8 to communicate with the reservoir through the discharge passage 38, thus reducing the pressure in the power chamber 8 to allow the power piston 3 to be retracted to the right.

The retracting movement of the input shaft 17 is restricted by the abutment of the second engaging portion 61A on the stop member 61 which is integral with the input shaft 17 against the second stop 55B on the reaction piston 55 which then abuts against the stop 17A on the input shaft 17, and under this condition, there is a greater separation between the ball valve 22 seated upon the first valve seat 20 and the second valve seat 24 on the annular pin 23, securing an increased channel area.

When the pressure in the power chamber 8 further reduces, the reaction piston 55 is driven forward relative to the power piston 3, in a manner integral with the input shaft 17, under the resilience of the spring 56, whereby the separation between the ball valve 22 and the second valve seat 24 on the annular pin 23 is reduced relatively, while still securing a sufficient channel area.

Immediately before the right end of the power piston 3 abuts against the plug 5, the second engaging portion 61A on the cylindrical stop member 61 which has been in abutment against the second stop 55B on the reaction piston 55 now abuts against the guide 5A. When the power piston 3 further retracts through a given stroke thereafter until its right end abuts against the plug 5 to stop its motion, the second engaging portion 61A on the cylindrical stop member 61 will be advanced by the given stroke relative to the power piston 3, maintaining the second valve seat 24 on the annular pin 23 at a position close to the ball valve 22 which is seated upon the first valve seat 20.

Accordingly, when the brake pedal is depressed for the next time, the second valve seat 24 will be seated upon the ball valve 22 immediately to interrupt the communication between the power chamber 8 and the reservoir, thus effectively reducing the lost motion during the initial phase of depression of the brake pedal.

In the present embodiment, in the inoperative position shown, it will be seen that the guide 5A, a sliding portion of the reaction piston 55 which slides relative to the guide 5A, a sliding portion of the input shaft 17 which slides relative to the reaction piston 55 as well as the spring 56 which urges the reaction piston 55 are disposed radially of each other while axially overlapping each other. Consequently, the axial dimension of the liquid pressure booster can be reduced as compared with the conventional arrangement in which the sliding portions of the reaction piston 55 and the input shaft 17 are disposed axially in tandem, for example.

In addition, the first engaging portion 55A formed on the reaction piston 55 is arranged to abut against the first stop 25A integrally formed on the cylindrical section 3A of the power piston 3 to restrict the rearward or retracting movement of the reaction piston while the second engaging portion 61A integrally formed on the input shaft 17 is arranged to abut against the second stop 55B formed on the reaction piston 55 for restricting the rearward or retracting movement thereof. Accordingly, the reaction piston 55, the retracting movement of which is restricted by the power piston 3, may be utilized as stop means for the input shaft 17. As a consequence, a need is removed for providing stop means connected to the power piston 3 and disposed inside the spring 56 which is disposed between the first engaging portion 55A of the reaction piston 55 and the power piston 3, again allowing the diametrical dimension of the liquid pressure booster to be reduced.

While the invention has been disclosed above in connection with a preferred embodiment thereof, it should be understood that a number of changes, substitutions and modifications therein will readily occur to one skilled in the art from the above disclosure without departing from the spirit and scope of the invention defined by the appended claims.

What is claimed is:

1. A reaction assembly for a liquid pressure booster including a power piston slidably disposed in a housing and having a cylindrical section at its rear portion, a power chamber defined in the rear side of the power piston within the housing, an input shaft slidably extending into the housing through the rear side of the power piston, a control valve disposed across the cylindrical section of the power piston and the free end of the input shaft inside for supplying a liquid pressure to the power chamber which depends on an input applied to the input shaft, a reaction piston slidably disposed around the input shaft and responsive to a liquid pressure within the power chamber by being retracted relative to the input shaft for abutment against a stop formed on the input shaft, and a spring disposed between the power piston and the reaction piston for maintaining the reaction piston at an advanced position spaced from the stop with a given magnitude of resilience; characterized by a guide extending from the housing and projecting into the cylindrical section of the power piston, the reaction piston being slidably fitted in the guide which thus slidably supports the reaction piston, the reaction piston including a shank portion in which the input shaft is slidably fitted, thus allowing the input shaft to be slidably supported by the reaction piston;

a first engaging portion formed on the reaction piston at a position forward of the guide and projecting radially outward within the cylindrical section of the power piston and reciprocable with respect to the power piston;

a first stop formed on the cylindrical section of the power piston for restricting a rearward movement of the first engaging portion beyond a given stroke, the spring being disposed in a clearance formed between the outer periphery of the guide and the inner periphery of the cylindrical section of the power piston to act between the first engaging portion and the power piston;

a second engaging portion formed on the input shaft to project radially outward within the reaction piston and reciprocable with respect to the reaction piston;

and a second stop formed on the reaction piston for restricting a rearward movement of the second engaging portion beyond a given stroke.

2. A reaction assembly according to claim 1 in which the second engaging portion formed on the input shaft is partly exposed externally of the reaction piston through an opening formed in the reaction piston, the second engaging portion abutting against the guide of the housing when the liquid pressure booster is inoperative to restrict a free rearward movement of the input shaft relative to the power piston.

3. A reaction assembly according to claim 2 in which the reaction piston is tubular in configuration and the first engaging portion is formed thereon at its front end in the form of a flange projecting radially outward, the front end face of the first engaging portion being formed with a recess which communicates with an axial space of the reaction piston and extending radially outward, with its inner wall defining the second stop, the rear end face of the first engaging portion which is in the form of a flange being shaved around its outer periphery in the form of a step so that the recess is in open communication with the rear side of the first engaging portion, the second engaging portion formed on the input shaft being disposed within the recess of the reaction piston so as to be capable of abutment against the second stop, the rear end face of the second engaging portion being exposed externally of the reaction piston through the opening of the recess.

4. A reaction assembly according to claim 1 in which the guide comprises a plug which is integrally connected to the housing to form part thereof.

5. A reaction assembly according to claim 1 in which a cylindrical stop member is integrally mounted on the input shaft and is formed with the second engaging portion which projects radially outward.

6. A reaction assembly according to claim 1 in which a tubular retainer is fitted and secured in the cylindrical section of the power piston, with a step formed in the inner peripheral surface of the retainer to provide the first stop.

7. A reaction assembly according to claim 6 in which the retainer is formed with another step, the spring being disposed between said another step and the first engaging portion to act therebetween.

* * * * *